United States Patent Office 3,600,394
Patented Aug. 17, 1971

3,600,394
2-AMINOALKYL-3-ARYLISOCARBOSTYRILS
William E. Coyne and John W. Cusic, Skokie, Ill.,
assignors to G. D. Searle & Co., Chicago, Ill.
No Drawing. Filed May 17, 1968, Ser. No. 729,934
Int. Cl. C07d 35/34
U.S. Cl. 260—288                                    4 Claims

ABSTRACT OF THE DISCLOSURE 3-phenylisocarbostyrils having a dialkylaminoalkyl or similar substituent at the 2-position are described herein. They possess anti-inflammatory, anti-bacterial, anti-protozoal, and anti-algal activity. The compounds are prepared by the reaction of a 3-phenylisocarbostyril with a strong base and an appropriate aminoalkyl halide.

SUMMARY OF THE INVENTION

The present invention relates to a group of substituted isocarbostyrils. In particular, it relates to a group of compounds having the following general formula

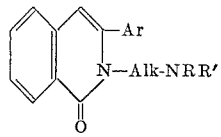

wherein Alk is lower alkylene separating the nitrogens attached thereto by at least two carbon atoms; —NRR' is selected from the group consisting of di(lower alkyl)amino, piperidino,1-pyrrolidinyl, morpholino, and 4-methyl-1-piperazinyl; and Ar is selected from the group consisting of phenyl, tolyl, halophenyl, mono- and polymethoxyphenyl, and pyridyl.

The lower alkylene radicals referred to above contain up to 6 carbon atoms and can be exemplified by ethylene, propylene, trimethylene, tetramethylene, and pentamethylene. The lower alkyl radicals referred to above contain up to 6 carbon atoms and can be exemplified by methyl, ethyl, propyl, isopropyl, butyl, and the like.

The organic bases of this invention form pharmaceutically acceptable salts with a variety of organic and inorganic acids. Such salts are formed with acids such as sulfuric, phosphoric, hydrochloric, hydrobromic, hydriodic sulfamic, citric, lactic, maleic, malic, succinic, tartaric, cinnamic, acetic, benzoic, gluconic, ascorbic, and related acids. They also form quaternary ammonium salts with a variety of organic esters of sulfuric, hydrohalic, and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethyl sulfate, methyl benzenesulfonate, ethyl toluenesulfonate, ethylene chlorohydrin, propylene chlorohydrin, allyl bromide, methallyl bromide, and crotyl bromide.

The compounds of the present invention are prepared by the reaction of an isocarbostyril of the formula

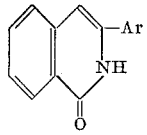

wherein Ar is defined as above, with a strong base and an appropriate aminoalkyl halide, preferably the chloride. The intermediate isocarbostyrils are prepared by the cyclization of the appropriate 2-(2-cyanophenyl)acetophenone with a strong acid such as sulfuric acid. The indicated acetophenones are prepared from 2-tolunitrile and an appropriate alkyl benzoate in the presence of a strong base.

The compounds of the present invention are useful because of their pharmacological properties. In particular, the present compounds possess anti-inflammatory activity. Thus, they have a phenylbutazone-like effect on edematous conditions. In addition, the present compounds inhibit the germination of seeds of trifolium and they possess anti-biotic activity against a variety of organisms. Thus, they inhibit the growth of bacteria such as Diplococcus pneumoniae, protozoa such as Tetrahymena gelleii, and algae such as Chlorella vulgaris. The present compounds can thus be combined with various known excipients and adjuvants in the form of dusts, solutions, suspensions, ointments, and sprays to provide compositions useful for disinfecting purposes.

The following examples are presented to further illustrate the present invention; they should not be construed as limiting it in spirit or in scope. In these examples, quantities are indicated in parts by weight unless parts by volume are specified and temperatures are indicated in degrees centigrade (° C.). The relationship between parts by weight and parts by volume is the same as that between grams and milliliters.

EXAMPLE 1

To a stirred solution of 11.7 parts of 2-tolunitrile in 110 parts of dimethyl sulfoxide is added 4.0 parts of sodium hydride as a 60% dispersion in oil. The mixture is stirred for 30 minutes, 13.6 parts of methyl benzoate is added, and the solution is stirred for 2 hours at room temperature. Water is added slowly to decompose the reaction mixture. The mixture is then further diluted with water and the precipitate which forms is separated by filtration and recrysallized from a mixture of benzene and hexane to give 2-(2-cyanophenyl)-acetophenone melting at about 107–110° C.

23.4 parts of 2-tolunitrile is reacted with 8.0 parts of sodium hydride and 45.2 parts of methyl 3,4,5-trimethoxybenzoate in 220 parts of dimethyl sulfoxide according to the procedure described in the preceding paragraph. The product obtained is 2-(2 - cyanophenyl)-3',4',5'-trimethoxyacetophenone melting at about 140–143° C. If the above procedure is repeated using methyl 4-toluate, methyl 4-fluorobenzoate, methyl 4-methoxybenzoate, and ethyl isonicotinate in place of the methyl 3,4,5-trimethoxybenzoate, the products obtained are, respectively, 2-(2-cyanophenyl)-4'-methylacetophenone, 2-(2-cyanophenyl)-4'-fluoroacetophenone, 2-(2-cyanophenyl)-4'-methoxyacetophenone, and 4-(2-cyanophenylacetyl)pyridine.

EXAMPLE 2

7.8 parts of sodamide is added to 300 parts by volume of liquid ammonia with stirring and this is followed by the addition of 23.4 parts of 2-tolunitrile in 35 parts of anhydrous ether. The mixture is stirred for 20 minutes and a solution of 34 parts of methyl 3-chlorobenzoate in 70 parts of ether is added. It is then stirred for 5 minutes and decomposed by the addition of 12.2 parts of ammonium chloride. The resulting mixture is diluted with ether and the ammonia is removed. Water is added to the residue and the mixture is acidified with hydrochloric acid. The ether layer is then separated and dried over magnesium sulfate and the solvent is evaporated to leave a residual solid. This is dissolved in benzene and chromatographed on a silica gel column. The solvent is evaporated form the eluate obtained by using 1% ethyl acetate in benzene as the eluent and the residual solid is recrystallized from ethanol to give 2-(2-cyanophenyl)-3'-chloroacetophenone melting at about 105–107° C.

EXAMPLE 3

To a stirred suspension of 4.9 parts of 2-(2-cyanophenyl)acetophenone in 160 parts of ethanol is added portionwise 184 parts of sulfuric acid. After the addition is complete, the mixture is refluxed for 3 hours and then poured into ice. The precipitate which forms is separated by filtration and recrystallized from ethanol to give 3-phenylisocarbostyril melting at about 196–200° C.

If the above procedure is repeated using 2-(2-cyanophenyl)-3'-chloroacetophenone and sulfuric acid, the product is 3-(3-chlorophenyl)isocarbostyril melting at about 223–238° C. Similarly, by following the above procedure and starting with the appropriate substituted ketone, the following compounds are obtained:

3-(4-tolyl)isocarbostyril.
3-(4-fluorophenyl)isocarbostyril.
3-(4-methoxyphenyl)isocarbostyril.
3-(4-pyridyl)isocarbostyril.

EXAMPLE 4

The procedure of Example 3 is repeated using 11.4 parts of 2-(cyanophenyl-3',4',5'-trimethoxyacetophenone, 310 parts of sulfuric acid, and 270 parts of ethanol. In this case, the crude solid product is mixed with 100 parts by volume of 15% aqueous sodium hydroxide and heated on a steam bath for 1 hour. The mixture is then cooled and extracted with chloroform and the combined chloroform extracts are dried over potassium carbonate. The solvent is then evaporated from the chloroform solution to leave a white solid which is triturated with hot ethanol. The ethanol is cooled and filtered; the solid which is separated in this way is 3-(3,4,5-trimethoxyphenyl)isocarbostyril melting at about 232–233° C.

EXAMPLE 5

A solution of 3.3 parts of 3-phenylisocarbostyril in 82 parts of dimethyl sulfoxide is stirred under nitrogen and 0.6 part of sodium hydride is added as a 60% dispersion in oil. The resultant mixture is stirred for 30 minutes, 5 parts of 2-diethylaminoethyl chloride is added, and the mixture is stirred for 18 hours at room temperature. The reaction mixture is then poured into water and the resulting mixture is extracted with ether. The combined ether extracts are dried over potassium carbonate and the solvent is evaporated to leave a colorless oil which is 2-(2-diethylaminoethyl)-3-phenylisocarbostyril. The oil is dissolved in ethanol and mixed with a saturated solution of oxalic acid in ethanol. A white precipitate forms. This is separated by filtration and recrystallized from ethanol to give 2-(2-diethylaminoethyl)-3-phenylisocarbostyril oxalate melting at about 179–181° C. The free base of this compound has the following formula

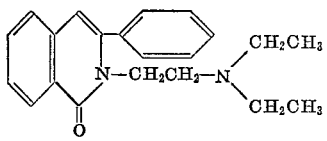

EXAMPLE 6

The procedure of Example 5 is repeated using 3-phenylisocarbostyril and the appropriate aminoalkyl chloride. In this way, the following products are obtained:

2-(β-dimethylaminopropyl)-3-phenylisocarbostyril
2-[2-(1-pyrrolidinyl)ethyl]-3-phenylisocarbostyril
1-(2-piperidinoethyl)-3-phenylisocarbostyril
2-(2-morpholinoethyl)-3-phenylisocarbostyril
2-[2-(4-methyl-1-piperazinyl)ethyl]-3-phenylisocarbostyril

EXAMPLE 7

1.2 parts of 3-(3-chlorophenylisocarbostyril is reacted with 0.19 part of sodium hydride and 3 parts of 2-diethylaminoethyl chloride in 110 parts of dimethyl sulfoxide according to the procedure described in Example 5. The product obtained is 3-(3-chlorophenyl)-2-(2-diethylaminoethyl)isocarbostyril oxalate melting at about 188–191° C. after recrystallization from ethanol.

In a similar manner, 2-diethylaminoethyl chloride is reacted with 3-(4-fluorophenyl)isocarbostyril, 3-(4-tolyl)isocarbostyril, and 3-(4-pyridyl)isocarbostyril to give, respectively, 2-(2-diethylaminoethyl)-3-(4-fluorophenyl) isocarbostyril, 2-(2-diethylaminoethyl)-3-(4-tolyl)isocarbostyril, and 2-(2-diethylaminoethyl)-3-(4-pyridyl)isocarbostyril.

EXAMPLE 8

The procedure of Example 5 is repeated using 2.0 parts of 3-(3,4,5-trimethoxyphenyl)isocarbostyril, 3 parts of 2-diethylaminoethyl chloride, 0.26 part of sodium hydride and 110 parts of dimethyl sulfoxide. In this case, the product is 2-(2-diethylaminoethyl)-3-phenyl-(3,4,5-trimethoxyphenyl)isocarbostyril oxalate melting at about 128–131° C. after recrystallization from a mixture of ethanol and ether.

If 3-(4-methoxyphenyl)isocarbostyril is reacted with 2-diethylaminoethyl chloride in a similar manner, the product is 2-(2-diethylaminoethyl)-3-(4-methoxyphenyl)isocarbostyril.

What is claimed is:

1. A compound of the formula

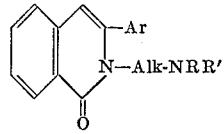

wherein Ar is selected from the group consisting of phenyl, tolyl, halophenyl, methoxyphenyl, trimethoxyphenyl and pyridyl; Alk is lower alkylene containing up to 6 carbon atoms and separating the nitrogens attached thereto by at least 2 carbon atoms; and —NRR' is selected from the group consisting of di(lower alkyl)amino, 1-pyrrolidinyl, piperidino, morpholino, and 4-methyl-1-piperazinyl.

2. A compound according to claim 1 which has the formula

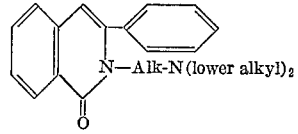

wherein Alk is lower alkylene containing up to 6 carbon atoms and separating the nitrogens attached thereto by at least 2 carbon atoms.

3. A compound according to claim 1 which is 2-(2-diethylaminoethyl)-3-phenylisocarbostyril.

4. A compound according to claim 1 which is 3-(3-chlorophenyl)-2-(2-diethylaminoethyl)isocarbostyril.

References Cited

UNITED STATES PATENTS

| | | | |
|---|---|---|---|
| 2,538,341 | 1/1951 | Ullyot | 260—288 |
| 2,809,969 | 10/1957 | Speeter | 260—288X |
| 3,452,027 | 6/1969 | Sulkowski | 260—288X |
| 2,647,902 | 8/1953 | Aschner | 260—289 |

DONALD G. DAUS, Primary Examiner

U.S. Cl. X.R.

260—247.5, 268, 286, 294.9, 465, 473, 583; 424—250, 258

FG-1050
(5/69)

UNITED STATES PATENT OFFICE
CERTIFICATE OF CORRECTION

Patent No. 3,600,394          Dated August 17, 1971

Inventor(s) John W. Cusic and William E. Coyne

It is certified that error appears in the above-identified patent and that said Letters Patent are hereby corrected as shown below:

Column 2, line 69 "form" should be -- from --.

Column 3, line 65 "2-(β-dimethylaminopropyl)" should be -- 2-(3-dimethylaminopropyl --.

Signed and sealed this 18th day of January 1972.

(SEAL)
Attest:

EDWARD M. FLETCHER, JR.      ROBERT GOTTSCHALK
Attesting Officer             Acting Commissioner of Patents